(12) United States Patent
Littlefield et al.

(10) Patent No.: US 7,542,950 B2
(45) Date of Patent: Jun. 2, 2009

(54) METHOD AND APPARATUS FOR PRODUCING THREE DIMENSIONAL SHAPES

(75) Inventors: Timothy R Littlefield, Goodyear, AZ (US); Jeanne K Pomatto, Scottsdale, AZ (US); George E. Kechter, Peoria, IL (US)

(73) Assignee: Cranial Technologies, Inc., Temple, AZ (US)

( * ) Notice: Subject to any disclaimer, the term of this patent is extended or adjusted under 35 U.S.C. 154(b) by 609 days.

(21) Appl. No.: 11/471,965

(22) Filed: Jun. 21, 2006

(65) Prior Publication Data

US 2007/0027826 A1 Feb. 1, 2007

Related U.S. Application Data

(62) Division of application No. 10/753,012, filed on Jan. 7, 2004, now Pat. No. 7,305,369.

(51) Int. Cl.
*G06E 1/00* (2006.01)
*G06E 3/00* (2006.01)
*G06F 15/18* (2006.01)
*G06G 7/00* (2006.01)
(52) U.S. Cl. .............................................. 706/16
(58) Field of Classification Search .................. None
See application file for complete search history.

(56) References Cited

U.S. PATENT DOCUMENTS

| | | | | | |
|---|---|---|---|---|---|
| 5,094,229 | A | * | 3/1992 | Pomatto et al. | 602/17 |
| 5,308,312 | A | * | 5/1994 | Pomatto et al. | 602/17 |
| 5,951,503 | A | * | 9/1999 | Pomatto | 602/17 |
| RE36,583 | E | * | 2/2000 | Pomatto et al. | 602/17 |
| 6,340,353 | B1 | * | 1/2002 | Pomatto et al. | 602/17 |
| 6,572,572 | B2 | * | 6/2003 | Pomatto et al. | 602/17 |
| 6,785,618 | B2 | * | 8/2004 | Kechter et al. | 702/39 |
| 7,127,101 | B2 | * | 10/2006 | Littlefield et al. | 382/154 |
| 7,142,701 | B2 | * | 11/2006 | Littlefield et al. | 382/128 |
| 7,162,075 | B2 | * | 1/2007 | Littlefield et al. | 382/154 |
| 7,177,461 | B2 | * | 2/2007 | Littlefield et al. | 382/156 |
| 7,227,979 | B2 | * | 6/2007 | Littlefield et al. | 382/128 |
| 7,242,798 | B2 | * | 7/2007 | Littlefield et al. | 382/154 |
| 7,245,743 | B2 | * | 7/2007 | Littlefield et al. | 382/103 |
| 7,280,682 | B2 | * | 10/2007 | Littlefield et al. | 382/128 |
| 7,305,369 | B2 | * | 12/2007 | Littlefield et al. | 706/16 |

* cited by examiner

*Primary Examiner*—Michael B Holmes
(74) *Attorney, Agent, or Firm*—Donald J. Lenkszus

(57) ABSTRACT

A method and system for automatically producing data representative of a modified head shape from data representative of a deformed head is provided. The method includes a step of processing captured data for the deformed head utilizing Principal Component Analysis (PCA) to generate PCA data representative of the deformed head. The method also includes the steps of providing the PCA data as input to a neural network; and utilizing the neural network to process the PCA data to provide data representative of a corresponding modified head shape.

11 Claims, 6 Drawing Sheets

001 PRODUCE CAST OF FIRST SHAPE
003 PRODUCE CAST OF SECOND CORRESPONDING SHAPE
005 DIGITALLY CAPTURE FIRST SHAPE
007 PRODUCE FIRST DIGITAL DATA
009 STORE FIRST DIGITAL DATA IN DATABASE
011 DIGITALLY CAPTURE CORRESPONDING SECOND SHAPE
013 PRODUCE SECOND DIGITAL DATA
015 STORE SAID SECOND DIGITAL DATA IN SAID DATABASE
017 PROVIDE ONE TO ONE CORRESPONDENCE BETWEEN EACH FIRST DIGITAL DATA AND CORRESPONDING SECOND DIGITAL DATA

FIG. 1

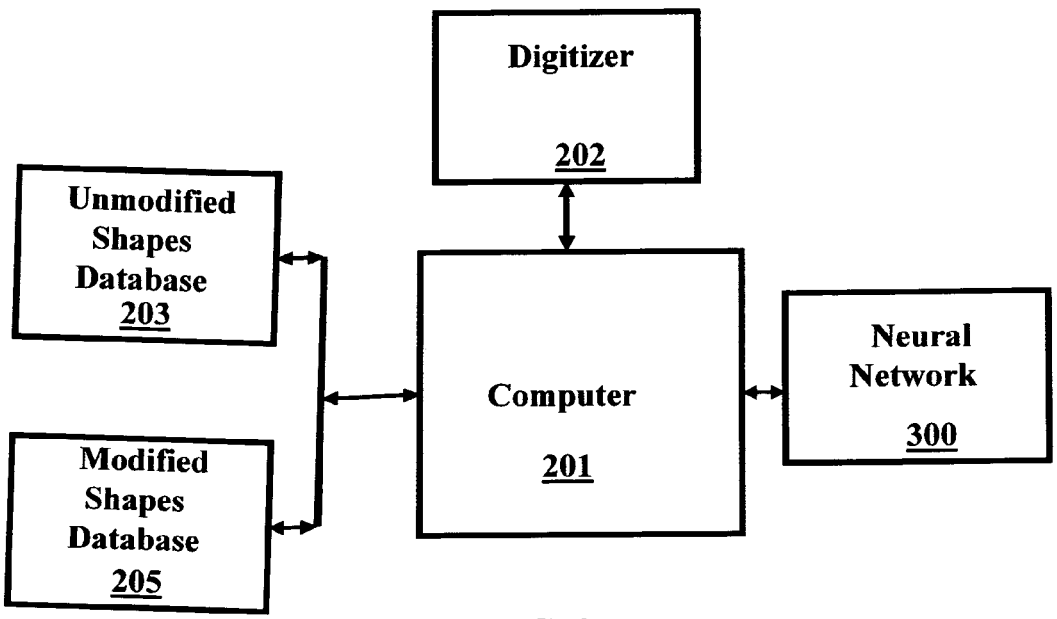

FIG. 2

401 PROVIDING A DATABASE OF FIRST OR UNMODIFIED SHAPES

403 PROVIDING A DATABASE OF CORRESPONDING SECOND OR MODIFIED SHAPES

405 ALIGNING EACH OF SAID FIRST OR UNMODIFIED SHAPES TO THE SAME ORIENTATION

407 ALIGNING EACH SECOND OR MODIFIED SHAPES AND THE CORRESPONDING FIRST OR UNMODIFIED SHAPE

409 NORMALIZE DATA

411 UTILIZING PRINCIPAL COMPONENT ANALYSIS WITH ALIGNED FIRST OR UNMODIFIED SHAPES AND CORRESPONDING ALIGNED SECOND OR MODIFIED SHAPES TO DETERMINE PCA COEFFICIENTS

413 PROVIDING ONE OR MORE NEURAL NETWORKS

415 TRAINING NEURAL NETWORK WITH A LEAST SQUARES SUPPORT VECTOR MACHINE

417 UTILIZING TRAINED NEURAL NETWORK TO OPERATE ON A NEW UNMODIFIED SHAPE TO PRODUCE A CORRESPONDING MODIFIED SHAPE

FIG. 4

| Hyperparameter | | |
|---|---|---|
| PCA Coefficient | Gamma | Sigma |
| 1 | 20 | 33 |
| 2 | 32 | 77 |
| 3 | 17 | 107 |
| 4 | 68 | 86 |
| 5 | 47 | 47 |
| 6 | 32 | 122 |
| 7 | 62 | 62 |
| 8 | 92 | 92 |
| 9 | 56 | 134 |
| 10 | 77 | 77 |
| 11 | 62 | 50 |
| 12 | 92 | 92 |
| 13 | 62 | 92 |
| 14 | 77 | 152 |
| 15 | 77 | 77 |
| 16 | 107 | 62 |
| 17 | 77 | 62 |
| 18 | 137 | 32 |
| 19 | 77 | 62 |
| 20 | 68 | 47 |
| 21 | 92 | 62 |
| 22 | 107 | 77 |
| 23 | 173 | 83 |
| 24 | 122 | 62 |
| 25 | 122 | 122 |
| 26 | 62 | 107 |
| 27 | 62 | 92 |
| 28 | 122 | 68 |
| 29 | 182 | 116 |
| 30 | 182 | 128 |
| 31 | 92 | 38 |
| 32 | 182 | 92 |
| 33 | 182 | 92 |
| 34 | 152 | 152 |
| 35 | 182 | 92 |
| 36 | 182 | 122 |
| 37 | 128 | 122 |
| 38 | 152 | 152 |
| 39 – 64 | 160 | 125 |

FIG. 5

METHOD AND APPARATUS FOR PRODUCING THREE DIMENSIONAL SHAPES

CROSS REFERENCE TO RELATED APPLICATIONS

This application is a division of application Ser. No. 10/753,012 filed Jan. 7, 2004 now U.S. Pat. No. 7,305,369. The following related patent applications were filed on even date therewith and are assigned to a common assignee: Ser. No. 10/753,013 Cranial Remodeling Device Database by T. Littlefield and J. Pomatto now U.S. Pat. No. 7,177,461: Ser. No. 10/753,118 Automatic Selection of Cranial Remodeling Device Configuration by T. Littlefield and J. Pomotto now U.S. Pat. No. 7,242,798: Ser. No. 10/753,006 Automatic Selection of Cranial Remodeling Device Trim Lines by T. Littlefield and J. Pomatto now U.S. Pat. No. 7,127,101: and Ser. No. 10/752,800 Cranial Remodeling Device Manufacturing System by T. Littlefield, and J. Pomatto now U.S. Pat. No. 7,142,701. The disclosures of the above-identified applications are incorporated herein.

FIELD OF THE INVENTION

This invention pertains to a system and method for producing data representative of desired three dimensional shapes from corresponding data representative of first three dimensional shapes, in general, and to a system and method for automatically producing data representative of a modified three dimensional head shapes from corresponding data representative of a deformed head shape.

BACKGROUND OF THE INVENTION

Cranial remodeling is utilized to correct for deformities in the head shapes of infants. Prior to the development of the Dynamic Orthotic Cranioplasty$^{SM}$ method of cranial remodeling by Cranial Technologies, Inc, the assignee of the present invention, the only viable approach for correction of cranial deformities was surgical correction of the shape of the cranium. Dynamic Orthotic Cranioplasty$^{SM}$ utilizes a treatment program in which a cranial remodeling band is custom produced for each infant to be treated. The band has an internal shape that produces the desired shape of the infant□s cranium.

In the past, the cranial remodeling band was produced by first obtaining a full size and accurate model of the infants actual head shape. This first model or shape was then modified to produce a second or desired head shape. The second or desired head shape is used to form the cranial remodeling band for the infant. The first shape was originally produced as a cast of the infant□s head. The second shape was similarly produced as a cast of the head. In the past the second or desired shape was obtained by manually modifying the first shape to form the desired shape.

Various arrangements have been considered in the past to automate the process of producing cranial remodeling devices. In some of the prior arrangements a scanner is utilized to obtain three dimensional data of an infant□s head. Such arrangements have the disadvantage in that scanners cannot obtain instantaneous capture of data of the entirety of an infant□s head. In addition, it is proposed to utilize expert systems to operate on scanned data to produce an image of a modified head shape from which a cranial remodeling device may be fabricated. However, because each head shape is unique, even the use of an expert system may not present an optimized solution to developing modified shapes suitable for producing a cranial remodeling device.

SUMMARY OF THE INVENTION

In accordance with the principles of the invention, a method for automatically producing data representative of a desired head shape from data representative of a deformed head is provided. The method includes a step of processing captured data for the deformed head utilizing Principal Component Analysis (PCA) to generate PCA data representative of the deformed head. The method also includes the steps of providing the PCA data as input to a neural network; and utilizing the neural network to process the PCA data to provide data representative of a corresponding modified head shape.

In accordance with another aspect of the invention the method includes training the neural network to generate data representative of deformed shapes to corresponding modified shapes In the illustrative embodiment of the invention the captured data comprises first data points represented as Cartesian coordinates. The first data points are utilized to produce second data representative of lengths of rays of predetermined orientation.

The number of second data points is chosen to be a predetermined number, n. An n×n covariance matrix is computed. Eigenvalues and eigenvectors are computed for the covariance matrix. The eigenvectors for a predetermined number of the largest eigenvalues are selected to define PCA shapes as the PCA data. In the illustrative embodiment the predetermined number of the largest eigenvalues is 64.

A system for automatically producing data representative of a modified head shape from data representative of a deformed head, in accordance with the principles of the invention comprises one or more processors operable to process captured data for a deformed head utilizing Principal Component Analysis (PCA) to generate PCA data representative of the deformed head. The one or more processors are further operated to provide the PCA data as input to a neural network. The one or more processors are operated to utilize the neural network to process the PCA data to provide data representative of a corresponding modified head shape.

In accordance with one aspect of the invention the one or more processors operates to train the neural network to generate data representative of modified shapes for corresponding deformed shapes.

In one embodiment of the invention a first database comprises a first plurality of first sets of captured data, each first set comprising captured data for a corresponding one first head shape. A second database comprises a second plurality of second sets of captured data; each second set comprises captured data for a modified head shape for a corresponding one of the first head shapes. A processor is operable with a neural network program to train the neural network program with the first plurality of first sets of captured data and the second plurality of second sets of captured data such that the neural network operates on a set of captured data for a first head shape to produce a corresponding modified head shape.

In accordance with an aspect of the invention a support vector machine program is operated to train the neural network program. In the illustrative embodiment of the invention the support vector machine comprises a least squares support vector machine.

In accordance with other aspects of the invention, the method and apparatus produce data representative of a modified three dimensional shape from data representative of a first three dimensional shape.

In accordance with another aspect of the invention, a database for use in generating PCA coefficients and for training a neural network comprises a first plurality of first sets of captured data, each comprising captured data for a corresponding one first head shape; and a second plurality of second sets of captured data each comprising captured data for a modified head shape for a corresponding one of said first head shapes.

In accordance with another aspect of the invention each first set of captured data is obtained from a capture of a cast model of a first head shape. Each second set of captured data is obtained from a capture of a cast model of a corresponding modified head shape.

In accordance with another aspect of the invention the captured data for each first set of captured data comprises a plurality of Cartesian coordinates each corresponding to a point on the corresponding one first head shape. The captured data for each second set of captured data comprises a second plurality of Cartesian coordinates each corresponding to a point on a corresponding one modified head shape.

In accordance with another aspect of the invention, captured data for each first set of captured data comprises a plurality of ray lengths defining the three dimensional shape of the corresponding first head shape. Captured data for each second set of captured data comprises a plurality of ray lengths defining the three dimensional shape of the corresponding modified head shape.

In accordance with another aspect of the invention captured data of each first set is converted from one coordinate system into data comprising a plurality of ray lengths defining the three dimensional shape.

BRIEF DESCRIPTION OF THE DRAWING

The invention will be better understood from a reading of the following detailed description taken in conjunction with the drawing figures in which like designations are utilized to identify like elements, and in which:

FIG. 1 illustrates steps in a method in accordance with the principles of the invention;

FIG. 2 is a block diagram of a system in accordance with the principles of the invention;

FIG. 4 illustrates steps in accordance with another aspect of the invention;

FIG. 5 is table;

DETAILED DESCRIPTION

Figure 3:
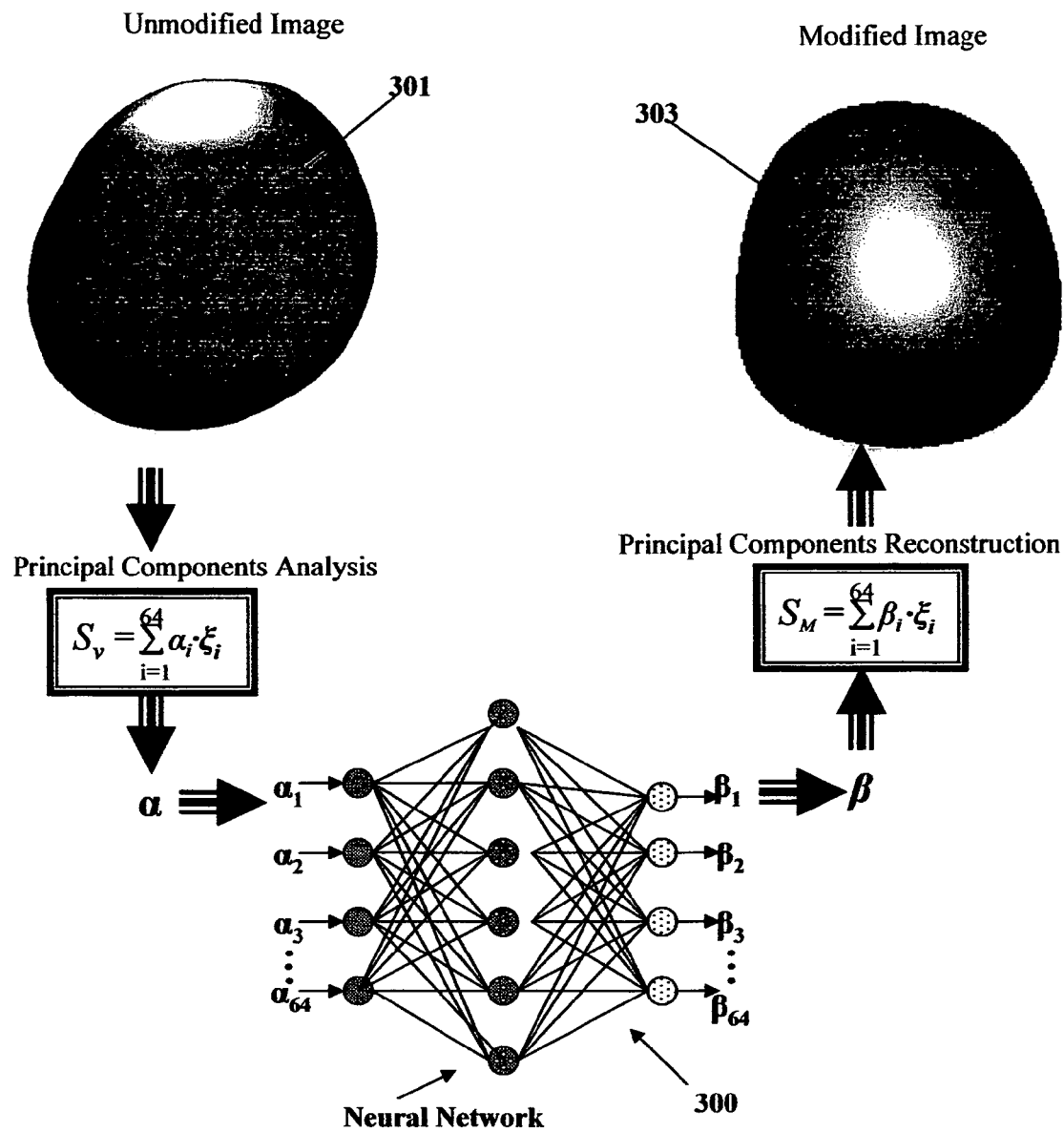
FIG. 3 illustrates use of Principal Components Analysis and neural networks in the illustrative embodiment of the invention.

Turning to FIG. 1, steps 001 and 003 are steps that were utilized in the past to produce a custom cranial remodeling device or band for an infant with a deformed head. A positive life size cast is made of an infant☐s head or a first shape as indicated at 001. A corresponding modified cast or second shape is then made from which a cranial remodeling band is produced at step 003. In the past, a cranial remodeling band for the infant is produced by forming the band on the second cast which represents a modified head shape. A library of hundreds of infant head casts and corresponding modified casts has been maintained at the assignee of the present invention and this library of actual head casts and the corresponding modified casts is believed to be a unique resource. It is this unique resource that is utilized to provide databases for developing the method and apparatus of the present invention.

An additional unique resource is that databases of additional information corresponding to each infant have been developed by the assignee of the present invention. That database includes information that identifies the type of cranial remodeling device for each infant head shape as well as the style of the cranial remodeling device and features selected for incorporation into the cranial remodeling device to provide for appropriate suspension and correction of the deformity. Still further, each cranial remodeling device has trim lines that are uniquely cut so as to provide for appropriate suspension and functionality as well as appearance. A further database developed by the assignee of the present invention has trim line data for each cranial remodeling device that has been previously fabricated corresponding to the casts for unmodified heads.

In a first embodiment of the invention, shown as system 200 in FIG. 2, the databases 203, 205 of unmodified shapes and corresponding modified shapes are used by a computer 201 to train a neural network 300.

In accordance with one aspect of the invention, each unmodified or first head shape is digitally captured at step 005 as shown in FIG. 1 by a digitizer 202 shown in FIG. 2, to produce first digital data at step 007 to provide a complete three dimensional representation of the entirety of a head including the top portion. The first digital data is stored in database 203 at step 009. Each corresponding modified or second head shape is digitally captured by digitizer 202 at step 011 to produce second digital data at step 013. The second digital data is stored in said database 205 at step 015. One to one correspondence is provided between each first digital data and the corresponding second digital data as indicated at step 017. The correspondence between digital data for first and corresponding second head shapes is maintained by utilizing any one of several known arrangements for maintaining correspondence.

In accordance with one aspect of the illustrative embodiment the first and second data stored comprises Cartesian coordinates for a plurality of points on the surface of the corresponding shape.

In the illustrative embodiment shown in FIG. 1, digitizer 202 utilizes a plurality of digital cameras that are positioned to substantially surround the entirety of a cast or a patients head such that a substantially instantaneous capture of the cast or of the infants head is obtained. As used herein, the term ☐digitizer☐ is utilized to identify any data capture system that produces digital data that represents the entirety of a cast or a head and which is obtained from a substantially instantaneous capture.

In accordance with an aspect of the illustrative embodiment of the invention, neural network 300 is ☐trained☐, as explained below, so that captured data of a first or unmodified shape 301 shown in FIG. 3 which has no corresponding second or modified shape is processed by neural network 300 to produce a second or modified shape 303. More specifically, principal components analysis (PCA) is utilized in conjunction with neural network 300. Neural network 300 is trained by utilizing captured data for first shapes from database 203 with corresponding captured data for second shapes from database 205.

Turning to FIG. 4, operation of system 200 is shown. At steps 401 and 403, one or more databases are provided to store data for a plurality of first or unmodified captured shapes and to store data for a plurality of corresponding second or modified captured shapes.

The data from each captured first and second image is represented using the same number of data points. In addition, all captured images are consistently aligned with each other.

The captured data for all head shapes represented in the databases 203, 205 of are aligned in a consistent way. The consistent alignment or image orientation has two separate aspects: alignment of all captured modified images with each other as shown at step 405; and alignment of each unmodified captured image with the corresponding modified captured image as shown at step 407. Alignment of unmodified and modified captured images ensures that the neural network will consistently apply modifications. Alignment of the modified captured images with one another allows PCA to take advantage of the similarities between different cast shapes.

The casts from which the captured images are obtained do not include facial details. Typically the face portion is merely a plane. The position of the face plane is really a result of deformity. To align the shapes a manually iterative visualization process is utilized. This approach □solved□half of the alignment issue □aligning all of the modified images with each other so that the principal components analysis could take advantage of the similarities between these shapes.

To align each unmodified captured image with its corresponding captured modified image, alignment of the face planes is was utilized. For the most part, the face planes represent a portion of the shapes that are not modified from the unmodified to the modified head shape and provide consistency. An additional attraction to this approach is that there on the head actual casts, there is writing on the face planes and this writing is visible in the texture photographs that can be overlaid onto the captured images. Alignment of face planes and writing provides a precise registration of the unmodified and modified captured images.

An automated approach to this alignment was developed using several of the first captured images. The automated alignment works where texture photographs are well focused and clear. In other cases automated alignment is supplemented with alignment by selecting □freehand□ points on both the modified and unmodified images using commercially available software and then using the registration tool of that software. This approach aligned all unmodified captures with modified captures so that corrections would be consistently applied.

The capture data for both the unmodified and modified head shapes are normalized at step 409 for training the neural network. As part of the normalization, a scale factor is stored for each for each normalized head or shape set.

As indicated at step 411, PCA is utilized with the aligned shapes to determine PCA coefficients. Because PCA uses the same set of basis vectors (shapes) to represent each head (only the coefficients in the summation are changed), each captured image is represented using the same number of data points. For computational efficiency, the number of points should be as small as possible.

The original digitized data for first and second shapes stored in databases 203, 205 represent each point on a surface using a three-dimensional Cartesian coordinate system. This approach requires three numbers per point: the x, y, and z distances relative to an origin. In representing the head captures, we developed a scheme that allows us to represent the same information using only one number per data point. Mathematically the approach combines cylindrical and spherical coordinate systems. It should be noted that to obtain three dimensional representations of an object, a spherical coordinate system may be utilized. However, in the embodiment of the invention, the bottom of the shape is actually the neck of the infant, and is not of interest.

Conceptually this approach is similar to a novelty toy known as □a bed of nails.□ Pressing a hand or face against a grid of moveable pins pushes the pins out to form a 3D copy on the other side of the toy. This approach can be thought of as a set of moveable pins protruding from a central body that is shaped like a silo □ a cylinder with a hemisphere capped to the top. The pins are fixed in their location, except that they can be drawn into or out of the central body. Using this approach, all that is needed to describe a shape is to give the amount that each pin is extended.

To adequately represent each head shape, a fixed number of approximately 5400 data points are utilized. To represent each of the captures using a fixed number of data points, the distance that each □pin□ protrudes is computed. This is easily achieved mathematically by determining the point of intersection between a ray pointing along the pin direction and the polygons provided by data from the infrared imager. A set of such □pins□were selected as a reasonable compromise between accuracy of the representation and keeping the number of points to a minimum for efficiency in PCA. The specific set of points was copied from one of the larger cast captures. This number was adequate for a large head shape, so it would also suffice for smaller ones. A commercially available program used to execute this □interpolation□algorithm requires as input the original but aligned capture data and provides as output the set of approximately 5400 □pin lengths□ that represent the shape.

Using the consistent alignment and the consistent array of data points described above, the normalized data for each captured cast was interpolated onto this □standard grid.□ Computing the covariance matrix produced an n×n matrix, where □n□ is the number of data points. As the name implies, this covariance matrix analyzes the statistical correlations between all of the □pin lengths.□ Computing the eigenvalues and eigenvectors of this large covariance matrix provides PCA basis shapes. The PCA shapes are the eigenvectors associated with the largest 64 eigenvalues of the covariance matrix. This approach of computing basis shapes using the covariance matrix makes optimal use of the correlations between all the data points used on a standard grid.

PCA analysis allows cast shapes to be represented using only 64 PCA coefficients. FIG. 5 sets out the hyper parameters for the 64 PCA coefficients. To transform the unmodified cast shapes into correct modified shapes, it is only necessary to modify the 64 PCA coefficients. For this processing task we selected and provide neural network 300 as indicated at step 413 of FIG. 4.

Neural networks are an example of computational tools known as □Learning Machines□and are able to learn any continuous mathematical mapping.

As those skilled in the art will understand, learning machines such as neural networks are distinguished from expert systems, in which programmers are utilized to program a system to perform the same branching sequences of steps that a human expert would perform. In effect, an expert system is an attempt to clone the knowledge base of an expert, whereas, a neural network is taught to □think□or operate based upon results that an expert might produce from certain inputs.

Figure 6:
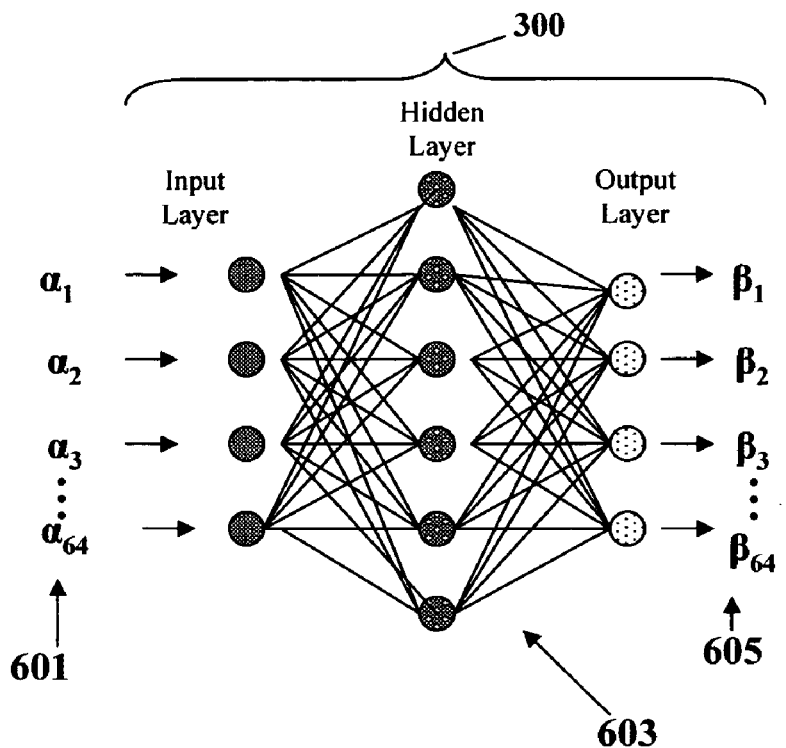
FIG. 6 represents a neural network.

FIG. 6 shows a conceptual diagram of a generic neural network 300. At a high level, there are three elements of a neural network: the inputs, $\alpha_1$-$\alpha_n$, the hidden layer(s) 603, and the outputs $\beta_1$-$\beta_n$. A neural network 300 operates on inputs 601 using the hidden layer to produce desired outputs 605. This is achieved through a process called "training."

Neural network 300 is constructed of computational neurons each connected to others by numbers that simulate strengths of synaptic connections. These numbers are referred to as "weights."

Training refers to modification of weights used in the neural network so that the desired processing task is "learned". Training is achieved by using PCA coefficients for captured data representative of unmodified casts of infant heads as inputs to the network 300 and modifying weights of hidden layers until the output of the neural network matches PCA coefficients for the captured data representative of corresponding modified casts. Repeating this training thousands of times over the entire set of data representing the unmodified and corresponding captured shapes produces a neural network that achieves the desired transformation as well as is statistically possible. In the illustrative embodiment, several hundred pairs of head casts were utilized to train neural network 300 at step 415.

Testing on additional data from pairs of casts that the neural network was not trained with, or "verification testing", was utilized in the illustrative embodiment to ensure that the neural network 300 has learned to produce the appropriate second shape from first shape captured data and has not simply "memorized" the training set. Once this training of neural network 300 is complete, as measured by the average least squares difference between the PCA coefficients produced by the network and those from the modified cast shapes, the PCA coefficient weights are "frozen" and the network is simply a computer program like any other computer program and may be loaded onto any appropriate computer.

A commercially available software toolbox was used to develop the learning machine. The particular type of learning machine produced is called a Support Vector Machine (SVM), specifically a Least Squares Support Vector Machine (LS-SVM). Just like the neural networks described above, the SVM "learns" its processing task by modifying "weights" through a "training" process. But in addition to weights, the LS-SVM requires a user to specify "hyper parameters." For the radial basis function (RBF) type of LS-SVM used in this work, there are two hyper parameters: $ã$ (gamma) and $ó$ (sigma). The relative values of these parameters control the smoothness and the accuracy of the processing task. This concept is very similar to using different degree polynomials in conventional curve fitting.

Figure 7:
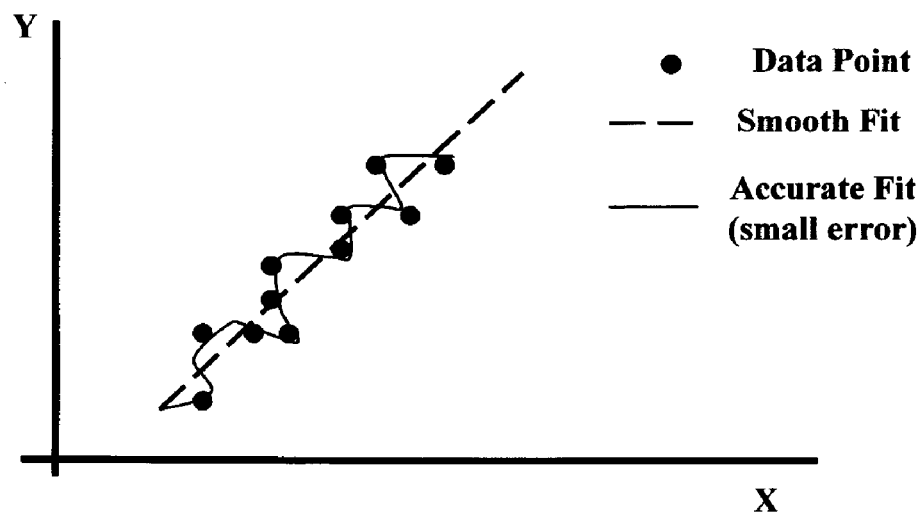
FIG. 7 is a graph.

FIG. 7 shows a curve-fitting task in two dimensions for easy visualization. Because there are a finite number of data points, (x, y)-pairs, it is always possible to achieve perfect accuracy by selecting a polynomial with a high enough degree. The polynomial will simply pass through each of the data points and bend as it needs to in between the data where its performance is not being measured. This approach provides ridiculous results in between the data points and is not a desired result. One solution to this problem is to require that the curve defined by the polynomial be smooth i.e., to not have sharp bends. This solution is fulfilled in the LS-SVM using $ã$ and $ó$. Higher values of $ó$ correspond to smoother curves and higher values of $ã$ produce greater accuracy on the data set.

An unmodified or first shape represented by captured data is processed utilizing a principal components analysis algorithm. The resulting PCA representation is processed by a neural network 300 to produce a second or modified PCA representation of a modified shape.

In the system of the illustrative embodiment of the invention cross-validation was used to choose the hyper-parameters. Data is randomly assigned to four groups. Three of the four groups were used to train the LS-SVM, and the remaining set was used to measure the performance in predicting the PCA coefficients for the modified head shapes. In turn, each of the four groups serves as the test set while the other three are used for training. The group assignment/division was repeated two times, so a total of eight training and test sets were analyzed (four groups with two repetitions). This process was repeated for a grid of ($ã$, $ó$)-pairs ranging from 0 "200 on both variables. The range was investigated using a 70×70 grid of ($ã$, $ó$)-pairs, so a total of 4900 neural nets were tested for each of the first 38 PCA coefficients. From this computationally intensive assessment, hyper-parameters were determined and validated for the first 38 PCA coefficients and extrapolated those results to select hyper-parameters for the remaining 26. Further "tuning" of the remaining 26 PCA hyper-parameters is unlikely to produce significant improvement in the final results because the first PCA coefficients are the most influential on the solution. The table shown in FIG. 5 presents the results for the hyper-parameter tuning.

Once hyper parameters were tuned, the LS-SVM models generally produced errors of less than two percent for the PCA coefficients of the modified casts in test sets (during cross-validation). Applying these tuned models to head casts that were not part of the cross-validation or training sets also generated excellent results.

There is a surprising variability of the head shapes as represented by cast shapes. Modified casts are not simply small changes to a consistent "helmet shape." Each is uniquely adapted to the unmodified shape that it is intended to correct. Being so strongly coupled to the unmodified shapes makes these modified casts surprisingly different from one another. Of the several hundred casts that we analyzed, each is unique.

Interpolating the aligned shapes also provided surprises and challenges. The "bed of nails" concept is very effective in reducing the size of the data sets and providing a consistent representation for PCA. It helps reduce the number of data sets that would have otherwise been required to train a larger neural network. Instead of representing each data point by three components, each data point is represented by one component thereby reducing the number of data sets significantly. By utilizing this approach, the process is speeded up significantly.

Returning to FIG. 4, at step 415, neural network 300 is trained as described above. Once neural network 300 is trained, it is then utilized to operate on new unmodified heads or shapes to produce a modified or second shape as indicated at step 417.

Figure 8:
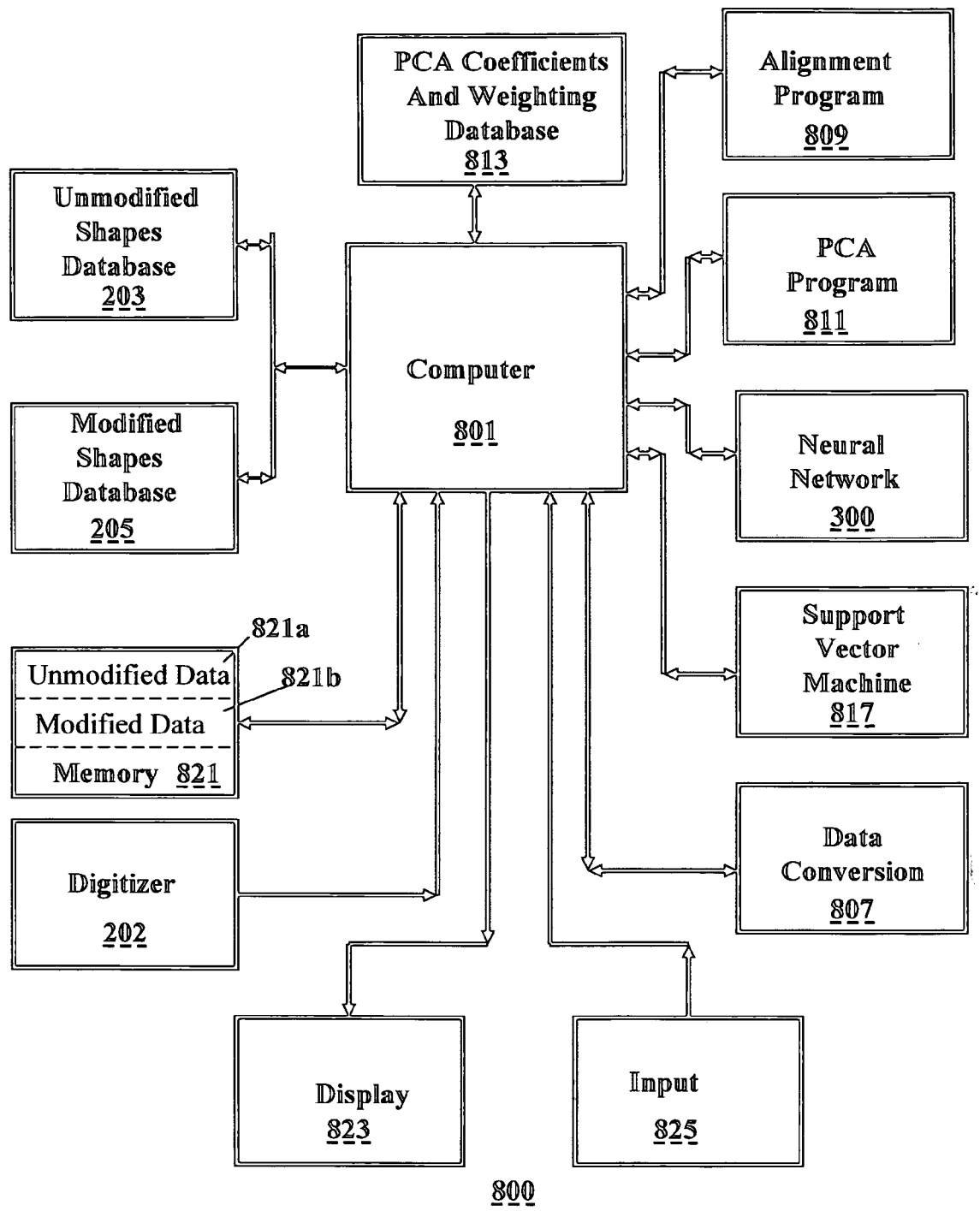
FIG. 8 is a block diagram of a system in accordance with the principles of the invention.

Turning now to FIG. 8, a block diagram of a system 800 in accordance with the principles of the invention is shown. System 800 is utilized to both train a neural network 300 described above and then to utilize the trained neural network 300 to provide usable modified head shapes from either casts of deformed head shapes or directly from such an infant's head.

System 800 includes a computer 801 which may any one of a number of commercially available computers. Computer 801 has a display 823 and an input device 825 to permit visualization of data and control of operation of system 800.

Direct head image capture is a desirable feature that is provided to eliminate the need to cast the children's head. An image capturing digitizer 202 is provided that provides substantially instantaneous image captures of head shapes. The digitized image 821$a$ is stored in a memory 821 by computer 801. Computer 801 utilizes a data conversion program 807 to normalize data, store the normalized data in memory 821 and its scaling factor, and to convert the normalized, captured data to □bed of nails□data as described above. Computer 801 stores the modified, normalized data 821b in memory 821. Computer 801 utilizing an alignment program 809 to align modified data 821b to an alignment consistent with the alignments described above and to store the aligned data in an unmodified shapes database 803. Computer 801 obtains PCA coefficients and weightings from a database 813 and utilizes neural network 300 and a support vector machine 817 to operate on the data for a first shape stored in memory 821a to produce data for a modified or second shape that is then stored in memory 821b. The data for the modified shape stored in memory 821b may then be utilized to fabricate a cranial remodeling device or band for the corresponding head.

The invention has been described in terms of illustrative embodiments. It will be apparent to those skilled in the art that various changes and modifications can be made to the illustrative embodiments without departing from the spirit or scope of the invention. It is intended that the invention include all such changes and modifications. It is also intended that the invention not be limited to the illustrative embodiments shown and described. It is intended that the invention be limited only by the claims appended hereto.

What is claimed is:

1. A method for automatically producing data representative of a modified head shape from data representative of a deformed head for utilization in a system for producing cranial remodeling devices, comprising:
   providing a neural network trained with a first plurality of first sets of data, each said first set comprising captured data for a corresponding one first head shape, and with a second plurality of second sets of captured data, each said second set comprising captured data for a modified head shape for a corresponding one of said first head shapes;
   utilizing said neural network to operate on data representative of a deformed head to produce data representative of a modified head shape;
   providing a computer readable memory; and
   storing said data representative of a modified head shape in said computer readable memory for use in producing a cranial remodeling device.

2. A method for automatically producing data representative of a modified head shape from data representative of a deformed head, comprising:
   providing one or more computer readable memories comprising a first database and a second database;
   providing a neural network;
   providing to said neural network a first plurality of first sets of captured data from said first database, each said first set comprising captured data for a corresponding one first head shape cast;
   providing to said neural network a second plurality of second sets of captured data from said second database, each said second set comprising captured data for a modified head shape cast for a corresponding one of said first head shapes;
   training said neural network with said first plurality of first sets of captured data and said second plurality of second sets of captured data such that said neural network will operate on a set of captured data for a first head shape to produce a new data set defining a unique modified head shape corresponding to said first head shape; and
   storing said new data set as a third database in one of said one or more computer readable memories.

3. A method in accordance with claim 2, comprising:
   providing a support vector machine;
   utilizing said support vector machine to train said neural network.

4. A method in accordance with claim 3, wherein:
   said support vector machine comprises a least squares support vector machine.

5. A system for automatically producing data representative of a modified head shape from data representative of a deformed head, comprising:
   a first database comprising a first plurality of first sets of data, each said first set comprising data for a corresponding one first head shape;
   a second database comprising a second plurality of second sets of data, each said second set comprising captured data for a modified head shape for a corresponding one of said first head shapes;
   a neural network program; and
   a processor operable with said neural network program to train said neural network program with said first plurality of first sets of data and said second plurality of second sets of data such that said neural network operates on a set of data for a first deformed head shape to produce a data set defining a unique corresponding modified head shape.

6. A system in accordance with claim 5, comprising:
   a support vector machine;
   said a support vector machine program operable to train said neural network program.

7. A system in accordance with claim 6, wherein:
   said support vector machine comprises a least squares support vector machine.

8. A method for automatically producing data representative of a modified three dimensional shape from data representative of a first three dimensional shape, comprising:
   providing a neural network;
   utilizing said neural network to operate on a first set of data representative of a first shape to produce a second set of data corresponding to a modified three dimensional head shape; and
   storing said second set of data in a computer readable memory for utilization in forming a cranial orthosis.

9. A method in accordance with claim 8, comprising:
   training said neural network with first plurality of first sets of data and said second plurality of second sets of data such that said neural network operates on a set of captured data for a three dimensional shape to produce a corresponding modified three dimensional shape.

10. A method in accordance with claim 9, comprising:
    providing a support vector machine; and
    utilizing said support vector machine to train said neural network.

11. A method in accordance with claim 10, wherein:
    said support vector machine comprises a least squares support vector machine.

* * * * *